United States Patent
Ostromek

(10) Patent No.: US 7,176,963 B2
(45) Date of Patent: Feb. 13, 2007

(54) METHOD AND SYSTEM FOR REAL-TIME IMAGE FUSION

(75) Inventor: Timothy E. Ostromek, Richardson, TX (US)

(73) Assignee: Litton Systems, Inc., Woodland Hills, CA (US)

(*) Notice: Subject to any disclaimer, the term of this patent is extended or adjusted under 35 U.S.C. 154(b) by 805 days.

(21) Appl. No.: 10/336,050

(22) Filed: Jan. 3, 2003

(65) Prior Publication Data

US 2004/0130630 A1    Jul. 8, 2004

(51) Int. Cl.
*H04N 5/232* (2006.01)
*H04N 5/228* (2006.01)

(52) U.S. Cl. .................. 348/218.1; 348/222.1

(58) Field of Classification Search ............ 348/218.1, 348/222.1, 227.1, 244, 207.99; 250/208.1
See application file for complete search history.

(56) References Cited

U.S. PATENT DOCUMENTS 4,281,337 A * 7/1981 Nakamura ............... 348/227.1
4,395,730 A   7/1983 Shen
6,665,010 B1 * 12/2003 Morris et al. ............ 348/297

FOREIGN PATENT DOCUMENTS

| EP | 1 154 489 | 11/2001 |
| JP | 57 026 720 | 2/1982 |
| WO | WO 01/84828 | 11/2001 |

OTHER PUBLICATIONS

International Search Report issued for PCT/US2004/000373, dated Jul. 26, 2004.

* cited by examiner

*Primary Examiner*—Ngoc-Yen Vu
*Assistant Examiner*—Adam L Henderson
(74) *Attorney, Agent, or Firm*—Fulbright & Jaworski LLP

(57) ABSTRACT

A system, a method, and software for image fusion are disclosed. Image sensors sense light and generate image sensor data in response to the light. Spectral detectors detect energy of the light proximate each image sensor, and a voltage value corresponding to the detected energy is determined. A weight factor for each image sensor is calculated according to the voltage value. The image sensor data from each image sensor is weighted according to the weight factor for the image sensor, and the weighted image sensor data are fused.

23 Claims, 1 Drawing Sheet

METHOD AND SYSTEM FOR REAL-TIME IMAGE FUSION

TECHNICAL FIELD OF THE INVENTION

This invention relates generally to the field of imaging systems and more specifically to a method and system for real-time image fusion.

BACKGROUND OF THE INVENTION

Multiple sensor imaging systems generate an image of an object by fusing image sensor data that are collected by multiple image sensors. Fusing image sensor data from multiple image sensors, however, has posed challenges. In some systems, image sensor data are continually monitored in order to detect changes in the image sensor data. The process of fusing the image sensor data is adjusted in response to changes in the image sensor data. Continually monitoring the image sensor data for changes and adjusting the fusion process in response to changes, however, require processing time and power, resulting in slower and less efficient imaging systems. Consequently, fusing image sensor data from multiple image sensors has posed challenges for the design of imaging systems.

SUMMARY OF THE INVENTION

In accordance with the present invention, a method and system for real-time image fusion are provided that substantially eliminate or reduce the disadvantages and problems associated with previously developed systems and methods.

According to one embodiment of the present invention, a method for image fusion is disclosed. Image sensors sense light and generate image sensor data in response to the light. Energy of the light proximate each image sensor is detected by a spectral detector, and a voltage value corresponding to the detected energy proximate the image sensor is determined. A weight factor for each image sensor is calculated according to the voltage value. The image sensor data from each image sensor is weighted according to the weight factor for the image sensor, and the weighted image sensor data are fused.

According to one embodiment of the present invention, a system for image fusion is disclosed. Image sensors sense light and generate image sensor data in response to the light. Spectral detectors proximate the image sensors detect energy of the light proximate the image sensor, and determine a voltage value in response to the detected energy. An fusing module calculates a weight factor for each image sensor according to the voltage value, weights the image sensor data from each image sensor according to the weight factor for the image sensor, and fuses the weighted image sensor data.

According to one embodiment of the present invention, software for image fusion embodied in a computer-readable medium is disclosed. When executed by a computer, the software receives image sensor data generated by image sensors in response to sensing light, and receives data describing energy detected proximate each image sensor. The software also determines a voltage value corresponding to the detected energy proximate the image sensor, and calculates a weight factor for each image sensor according to the voltage value. The software also weights the image sensor data from each image sensor according to the weight factor for the image sensor, and fuses the weighted image sensor data.

Embodiments of the invention may provide numerous technical advantages. A technical advantage of one embodiment is that weight factors for the image sensors are calculated from energy detected near the image sensors. The weight factors are used to quickly fuse the image sensor data, allowing for real-time fusion of the image sensor data. Another technical advantage of one embodiment is that spectral detectors determine voltage values from energy detected near the image sensors. The weight factors are readily calculated from the voltage values, using little processing time and power.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
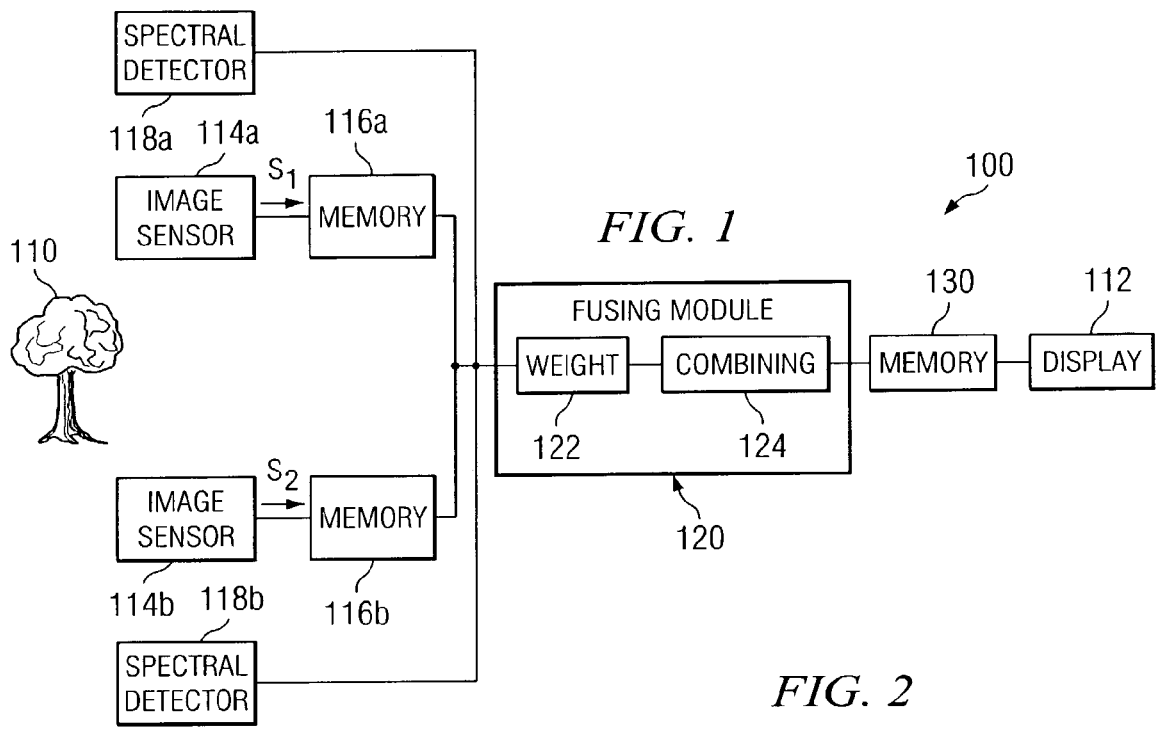
FIG. 1 is a block diagram of one embodiment of a system for fusing image sensor data that may be used in accordance with the present invention.
Figure 2:
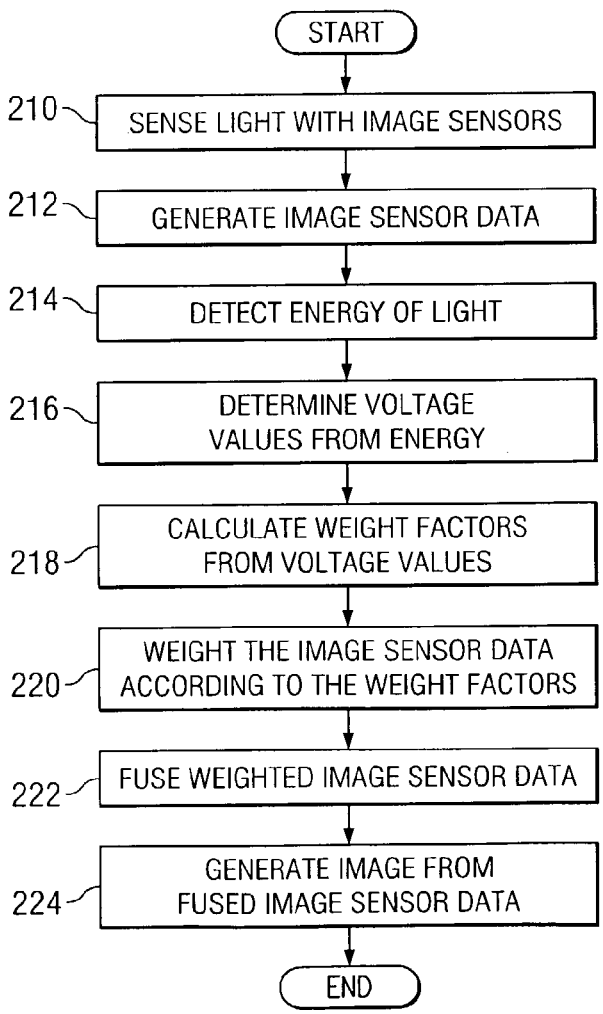
FIG. 2 is a flowchart demonstrating one embodiment of a method for fusing image sensor data that may be used in accordance with the present invention.

Embodiments of the present invention and its advantages are best understood by referring to FIGS. 1 and 2 of the drawings, like numerals being used for like and corresponding parts of the various drawings.

FIG. 1 is a block diagram of one embodiment of a system 100 for fusing image sensor data. System 100 receives light reflected from an object 110 and generates an image of object 110 on a display 112. The light reflected from object 110 includes information that may be used to generate the image. Image sensors 114 sense the light to produce image sensor data, and spectral detectors 118 detect the light to produce voltage values. System 100 fuses the image sensor data according to the voltage values to generate the image. System 100 may use any suitable configuration of software and/or hardware to fuse the image sensor data.

In the illustrated embodiment, image sensors 114a and 114b detect light reflected from object 110 and generate image sensor data $S_1$ and $S_2$ in response to the detected light. Image sensors 114 detect light within a range of wavelengths, and image sensor 114a may detect light within a range different from the range of light wavelengths detected by image sensor 114b. The ranges, however, may overlap. System 100 may include any suitable number of image sensors 114.

Image sensors 114 may detect certain types of energy of the light, for example, infrared energy. Image sensors 114 may include image sensors that enhance certain features of light, such as an image intensifier image sensor. Image sensors 114, however, may include any suitable image sensor, for example, a long wave infrared image sensor, a low light level charge coupled device (LLLCCD), or a complementary metal-oxide semiconductor (CMOS) image sensor. Additionally, image sensors 114 may differ from each other. The image sensor data may be optionally stored at memories 116 coupled to image sensors 114.

Spectral detectors 118a and 118b are proximate to image sensors 114a and 114b, respectively, and detect the energy of light near image sensors 114a and 114b, respectively, to determine voltage values $v_1$ and $v_2$ representing energy of light near image sensors 114a and 114b, respectively. To calculate a voltage value, a spectral detector 118 near image sensor 114 may detect energy in a range of wavelengths detected by image sensor 114 and determine energy values within the range. Spectral detector 118 may then integrate the energy values within the range to calculate a voltage value that is proportional to the energy near image sensor 114. Spectral detectors 118 may include any suitable detector for detecting energy near image sensors 114 and for determining voltage values, for example, a silicon, germanium, or indium gallium arsenide detector. Spectral detectors 118 may comprise a single or multi-segment detector. A multi-segment detector may provide for different weighting factors for different parts of the image. Spectral detector 118 may include an optical filter for filtering detected energy or an amplifier for amplifying detected energy.

Any suitable number of image sensors 114 and spectral detectors 118 may be used, where each image sensor 114 has an associated spectral detector 118. "Each" as used in this document means each member of a set or each member of a subset of the set. According to one embodiment, image sensors 114 may comprise spectral detectors 118, where the weighting factors are derived from metric analysis of the actual image sensor data.

A fusing module 120 coupled to memories 116 and spectral detectors 118 receives image sensor data from memories 116 or directly from sensors 114 and voltage values from spectral detectors 118, and fuses the image sensor data according to the voltage values. Fusing module 120 includes a weight module 122 and a combining module 124. Weight module 122 calculates weight factors $w_1$ and $w_2$ for image sensors 114a and 114b, respectively, from the voltage values $v_1$ and $v_2$, respectively.

Weight module 122 may use any suitable method for computing the weight factors. For example, to compute weight factor $w_1$ for image sensor 114a, fusing module may sum the voltage values $v_1$ and $v_2$ for all spectral detectors 118 to calculate a total voltage value $v_1 + v_2$. The weight factor $w_1$ for image sensor 114a may be equal to proportional value for image sensor 114a, that is, the voltage value for spectral detector 118a divided by the total voltage value, that is, $$w_1 = \frac{v_1}{v_1 + v_2}.$$

The weight factor $w_2$ for image sensor 114b may be calculated in a substantially similar manner. The weight factors may be computed according to any suitable function in any suitable manner, for example, electrical processing such as analog or digital signal processing using any suitable combination of hardware and/or software.

Combining module 124 requires weight factors $w_1$ and $w_2$, and weights the image sensor data $S_1$ and $S_2$ according to the weight factors $w_1$ and $w_2$. The image sensor data is weighted to determine the proportion of image sensor data that will be used to generate the final image. Additionally, combining module 124 fuses the weighted image sensor data $w_1 S_1$ and $w_2 S_2$. The fusion of the image sensor data may be described by $w_1 S_1 + w_2 S_2$.

A memory 130 coupled to fusing module 120 may be used to receive the fused image sensor data from fusing module 120 and transmit the data to display 112. Display 112 generates an image from the fused image sensor data. Display 112 may include any suitable device for displaying image data such as an organic light-emitting diode (OLED), a nematic liquid-crystal display (LCD), or a field emitting display (FED), in a panel display, an eyepiece display, or a near-to-eye display format. System 100 may include any suitable number of displays 112.

System 100 may be implemented as any suitable embodiment. According to one embodiment, image sensors 114a–b may comprise video cameras that generate S-analog data. Fusion module 120 comprises a video mixer that receives sensor data from sensors 114a–b and is controlled by a processor version of spectral detectors 118a–b.

According to another embodiment, image sensor 114a comprises an infrared image sensor, and the corresponding spectral detector 118a comprises an infrared detector. Image sensor 114b comprises an image intensifier tube, and the corresponding spectral detector 118b comprises a visible light detector. The image intensifier tube may provide image sensor data for a collimator, an electro-optical filter, and a beam splitter in order to generate an image at a display 112 comprising an eyepiece. Fusion module 120 provides a control signal for the image intensifier tube to control, for example, gain, and provides a control signal for the electro-optical filter to control, for example, brightness, contrast, and color. Fusion module 120 may also provide an image for another display 112 such as a monitor.

Modifications, additions, or omissions may be made to the system without departing from the scope of the invention. Additionally, functions may be performed using any suitable logic comprising software, hardware, other logic, or any suitable combination of the preceding.

FIG. 2 is a flowchart illustrating one embodiment of a method for fusing image sensor data. The method begins at step 210, where image sensors 114 detect light reflected from object 110. The light includes information that may be used to generate an image of object 110. At step 212, image sensors 114 generate image sensor data $S_1$ and $S_2$ in response to the detected light.

At step 214, spectral detectors 118 detect the energy of light near image sensors 114. Spectral detectors 118 may also filter or amplify the energy of the light. At step 216, spectral detectors 118 determine voltage values $v_1$ and $v_2$ from the detected energy. The voltage value may be determined by, for example, integrating the energy values for a range of light wavelengths detected by image sensor 114.

At step 218, for image sensors 114a and 114b, respectively, fusing module 120 calculates weight factors $w_1$ and $w_2$ for image sensors 114a and 114b, respectively, from voltage values $v_1$ and $v_2$, respectively, received from spectral detectors 118a and 118b, respectively. The weight factor for an image sensor 114a may be calculated by computing a proportional value, that is, dividing a voltage value $v_1$ for spectral detector 118a by a total voltage value $v_1 + v_2$. At step 220, the image sensor data $S_1$ and $S_2$ is weighted according to the weight factors to yield $w_1 S_1$ and $w_2 S_2$. At step 222, the weighted image sensor data is fused using $w_1 S_1 + w_2 S_2$. At step 224, display 112 generates and displays an image from the fused image sensor data. After displaying the image, the method terminates.

Embodiments of the invention may provide numerous technical advantages. A technical advantage of one embodiment is that weight factors for image sensors 114 are calculated from energy detected near image sensors 114. The weight factors are used to quickly fuse the image sensor data, allowing for real-time fusion of the image sensor data. Another technical advantage of one embodiment is that spectral detectors 118 determine voltage values from energy detected near the image sensors. The weight factors are readily calculated from the voltage values, using little processing time and power.

Although an embodiment of the invention and its advantages are described in detail, a person skilled in the art could make various alterations, additions, and omissions without departing from the spirit and scope of the present invention as defined by the appended claims.

What is claimed is:

1. A method for image fusion, the method comprising:
sensing light using a plurality of image sensors;
generating image sensor data in response to the light;
detecting, proximate each image sensor, energy of the light;
determining a voltage value corresponding to the detected energy proximate the image sensor;
calculating a weight factor for each image sensor according to the voltage value corresponding to the detected energy proximate the image sensor;
weighting the image sensor data from each image sensor according to the weight factor for the image sensor; and
fusing the weighted image sensor data.

2. The method of claim 1, wherein determining the voltage value comprises:
determining a plurality of energy values of the detected energy within a range of wavelengths associated with the image sensor;
integrating the energy values; and
calculating the voltage value using the integrated energy values.

3. The method of claim 1, wherein determining the voltage value comprises:
filtering the detected energy; and
calculating the voltage values from the filtered energy.

4. The method of claim 1, wherein determining the voltage value comprises:
amplifying the detected energy; and
calculating the voltage values from the amplified energy.

5. The method of claim 1, wherein calculating the weight factor for an image sensor comprises:
adding the voltage values to calculate a total voltage value; and
dividing the voltage value corresponding to the image sensor by the total voltage value.

6. The method of claim 1, wherein detecting the energy comprises using a spectral detector proximate the image sensor to detect the energy.

7. The method of claim 1, wherein:
a first image sensor is operable to sense light within a first range of wavelengths; and
a second image sensor is operable to sense light within a second range of wavelengths, the first range of wavelengths overlapping the second range of wavelengths.

8. The method of claim 1, further comprising displaying an image generated from the fused image sensor data.

9. A system for image fusion, the system comprising:
a plurality of image sensors operable to:
sense light; and
generate image sensor data in response to the light;
a plurality of spectral detectors, each spectral detector proximate an image sensor and operable to:
detect energy of the light proximate the image sensor; and
determine a voltage value in response to the detected energy; and a fusing module coupled to the image sensors and to the spectral detectors and operable to:
calculate a weight factor for each image sensor according to the voltage value corresponding to the detected energy proximate the image sensor;
weight the image sensor data from each image sensor according to the weight factor for the image sensor; and
fuse the weighted image sensor data.

10. The system of claim 9, wherein each spectral detector is operable to determine the voltage value by:
determining a plurality of energy values of the detected energy within a range of wavelengths associated with the image sensor;
integrating the energy values; and
calculating the voltage value from the integrated energy values.

11. The system of claim 9, wherein each spectral detector is operable to:
filter the detected energy; and
calculate the voltage values from the filtered energy.

12. The system of claim 9, wherein each spectral detector is operable to:
amplify the detected energy; and
calculate the voltage values from the amplified energy.

13. The system of claim 9, wherein the fusing module is operable to calculate the weight factor for an image sensor by:
adding the voltage values to calculate a total voltage value; and
dividing the voltage value corresponding to the image sensor by the total voltage value.

14. The system of claim 9, wherein:
a first image sensor is operable to sense light within a first range of wavelengths; and
a second image sensor is operable to sense light within a second range of wavelengths, the first range of wavelengths overlapping the second range of wavelengths.

15. The system of claim 9, further comprising a display coupled to the fusing module and operable to display an image generated from the fused image sensor data.

16. A computer program for image fusion, encoded on a computer readable medium for execution by a computer, the program operable to:
receive image sensor data generated by a plurality of image sensors in response to sensing light;
receive data describing energy detected proximate each image sensor;
determine a voltage value corresponding to the detected energy proximate the image sensor;
calculate a weight factor for each image sensor according to the voltage value corresponding to the detected energy proximate the image sensor;
weight the image sensor data from each image sensor according to the weight factor for the image sensor; and
fuse the weighted image sensor data.

17. The program of claim 16, wherein the software when executed by a computer is operable to determine the voltage value by:
determining a plurality of energy values of the detected energy within a range of wavelengths associated with the image sensor;
integrating the energy values; and
calculating the voltage value using the integrated energy values.

18. The program of claim 16, wherein the software when executed by a computer is operable to determine the voltage value by:
 filtering the detected energy; and
 calculating the voltage values from the filtered energy.

19. The program of claim 16, wherein the software when executed by a computer is operable to determine the voltage value by:
 amplifying the detected energy; and
 calculating the voltage values from the amplified energy.

20. The program of claim 16, wherein the software when executed by a computer is operable to calculate the weight factor for an image sensor by:
 adding the voltage values to calculate a total voltage value; and
 dividing the voltage value corresponding to the image sensor by the total voltage value.

21. The program of claim 16, wherein:
 a first image sensor is operable to sense light within a first range of wavelengths; and
 a second image sensor is operable to sense light within a second range of wavelengths, the first range of wavelengths overlapping the second range of wavelengths.

22. The program of claim 16, wherein the software when executed by a computer is operable to generate an image from the fused image sensor data.

23. A system for image fusion, the system comprising:
 a plurality of image sensors, each image sensor operable to:
  sense light within a range of wavelengths; and
  generate image sensor data in response to the light;
 a plurality of spectral detectors, each spectral detector proximate an image sensor and operable to:
  detect energy of the light proximate the image sensor;
  filter the detected energy;
  amplify the detected energy; and
  determine a voltage value in response to the detected energy by:
   determining a plurality of energy values of the detected energy within the range of wavelengths associated with the image sensor;
   integrating the energy values; and
   calculating the voltage value from the integrated energy values;
 a fusing module coupled to the image sensors and to the spectral detectors and operable to:
  calculate a weight factor for each image sensor according to the voltage value corresponding to the image sensor by:
   adding the voltage values corresponding to the plurality of image sensors to calculate a total voltage value; and
   dividing the voltage value for the image sensor by the total voltage value;
  weight the image sensor data from each image sensor according to the weight factor for the image sensor; and
  fuse the weighted image sensor data; and
 a display coupled to the fusing module and operable to display an image generated from the fused image sensor data.

* * * * *